Figure 1:
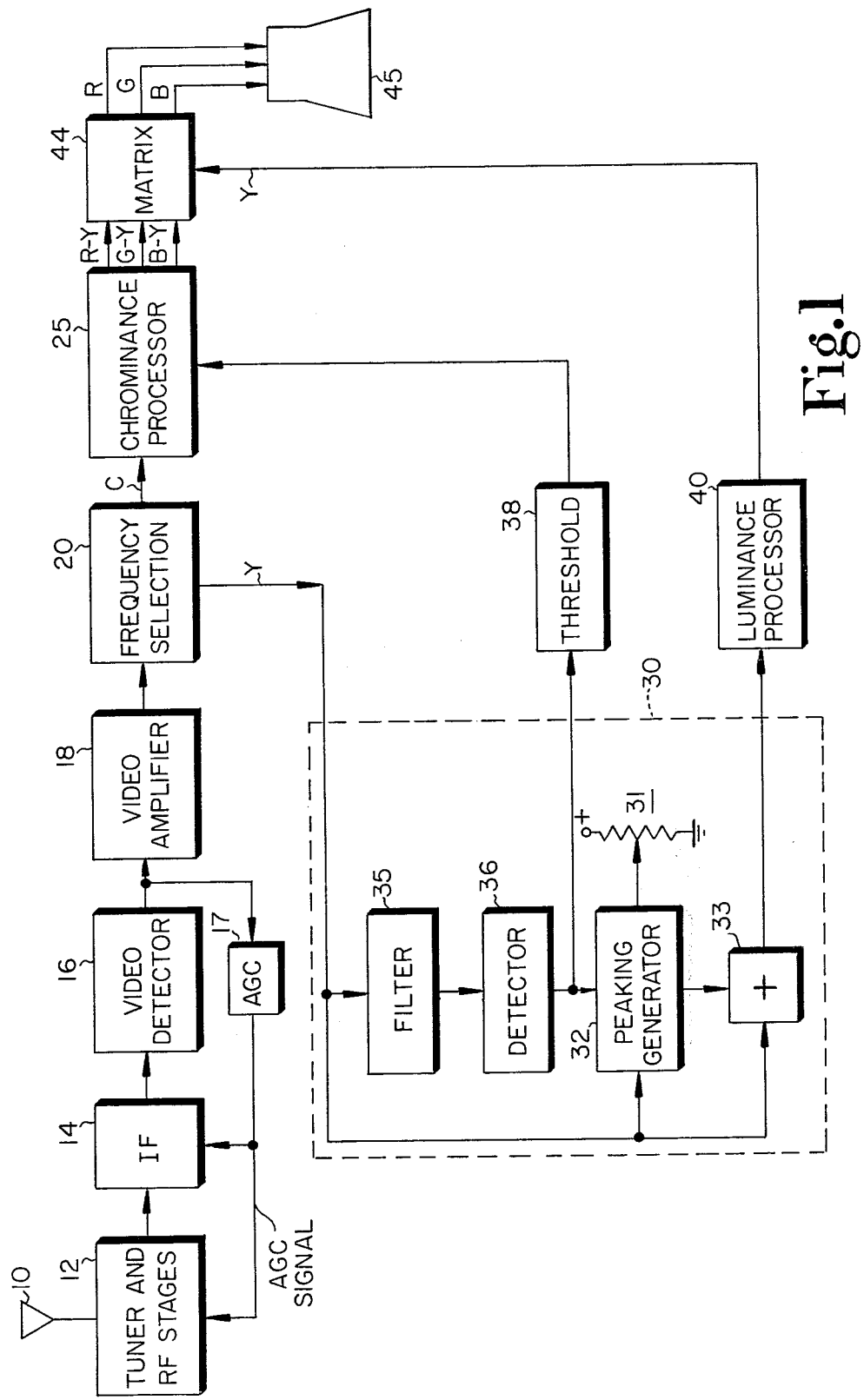

United States Patent [19]

Cochran

[11] 4,430,665
[45] Feb. 7, 1984

[54] AUTOMATIC VIDEO SIGNAL PEAKING AND COLOR CONTROL

[75] Inventor: Larry A. Cochran, Indianapolis, Ind.

[73] Assignee: RCA Corporation, New York, N.Y.

[21] Appl. No.: 330,386

[22] Filed: Dec. 14, 1981

[51] Int. Cl.³ .............................................. H04N 9/535
[52] U.S. Cl. ................................................... 358/37
[58] Field of Search ..................... 358/37, 38, 36, 39, 358/40, 21 R

[56] References Cited

U.S. PATENT DOCUMENTS 3,931,637  1/1976  Carpenter ............................ 358/38
4,110,790  8/1978  Wheeler .............................. 358/162

Primary Examiner—Richard Murray
Attorney, Agent, or Firm—Eugene M. Whitacre; Paul J. Rasmussen; Ronald H. Kurdyla

[57] ABSTRACT

A color television receiver includes apparatus for automatically controlling the high frequency peaking content of the luminance signal component of a color television signal. The luminance signal is controlled to exhibit significant depeaking in the presence of weak, noisy received color television signals, and, simultaneously, the magnitude of the chrominance signal component of the television signal is reduced to prevent a displayed color picture from appearing to exhibit oversaturated color.

14 Claims, 2 Drawing Figures

AUTOMATIC VIDEO SIGNAL PEAKING AND COLOR CONTROL

This invention concerns a system for automatically controlling the amount of peaking present in the luminance component of a color video signal processed by a color television receiver or equivalent system, and for simultaneously attenuating the chrominance component of the video signal when the luminance component is controllably depeaked when high frequency noise is excessive.

A reproduced image developed in response to video signals processed by a color television receiver or similar system can be subjectively improved or enhanced by increasing the slope or "steepness" of video signal amplitude transitions. Such enhancement, commonly referred to as signal "peaking," is typically associated with the high frequency information content of the video signal. For example, horizontal image peaking can be achieved by generating a signal "preshoot" just before an amplitude transition, and a signal "overshoot" just after an amplitude transition, so that black-to-white and white-to-black video signal amplitude transitions are accentuated.

The amount of peaking manifested by a video signal processed by a television receiver can vary from one channel to another and can be attributed to a variety of sources. Horizontal image peaking can be provided at the broadcast transmitter and by circuits within the television receiver in fixed or controllable amounts. Signal peaking or depeaking can also result from a signal "mismatch" (e.g., due to an impedance mismatch) in a cable television signal distribution path. Since signal peaking accentuates the high frequency response of a video signal, the presence of spurious signals including high frequency noise produced at the transmitter, in the propagation of the signal, and in the receiver is also a consideration in determining the amount of peaking and depeaking to be imparted to a video signal. Accordingly, it is desirable to automatically peak and depeak a video signal as a function of the high frequency content of a video signal including noise and peaking components imparted from various sources, to optimize the amount of video signal peaking consistent with an objective of providing a reproduced image with good image detail for various signal conditions. A particularly advantageous automatic peaking control system of this type is disclosed in U.S. Pat. No. 4,351,003 of W. E. Harlan, titled "Automatic Video Signal Peaking Control."

In the case of a color television receiver for processing a color television signal comprising image representative luminance and chrominance signal components, an included automatic peaking control system typically operates to control the high frequency peaking content of the luminance signal. It is herein recognized that when the automatic peaking control system causes the luminance signal to exhibit significantly reduced peaking (i.e., significant depeaking) in the presence of a weak received television signal which commonly includes a significant amount of spurious high frequency signals such as noise, a displayed color picture may appear to exhibit undesirably oversaturated color. This unwanted effect results from the fact that noise being coupled through the chrominance signal processing channel of the receiver adds to the chrominance component, while corresponding amounts of noise are absent from the luminance signal processed by the luminance channel of the receiver as a result of depeaking the luminance signal because the high frequency response of the luminance channel is reduced by the action of the automatic peaking control system.

In accordance with the principles of the present invention, in a color video signal processing system including an automatic luminance signal peaking control network, the described unwanted effect of oversaturated picture color under weak, noisy signal conditions is compensated for by controlling the magnitude of the chrominance component of the color video signal with a sense for reducing the color saturation of a displayed color picture, thereby producing a more pleasing color picture when the luminance signal is depeaked for weak, noisy signal conditions.

In accordance with a feature of the invention, the magnitude of the chrominance component is controlled in response to the presence of a control signal representative of a depeaked luminance signal, and a control signal indicative of the presence of a weak video signal.

Figure 2:
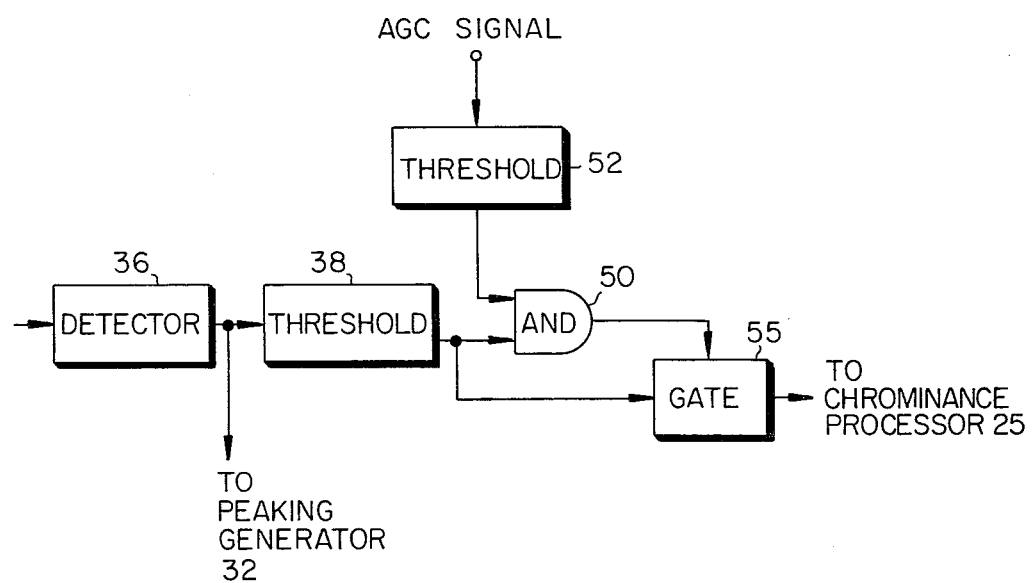

In the drawing:

FIG. 1 shows a block diagram of a portion of a color television receiver including an embodiment of signal control system including apparatus according to the present invention; and FIG. 2 shows another embodiment of the apparatus of FIG. 1.

In FIG. 1, broadcast color television signals received by an antenna 10 are applied to a tuner 12 including controllably tuned radio frequency (RF) amplification stages. Output signals from tuner 12 are applied to an intermediate frequency (IF) signal processing and amplifying network 14. IF signals from network 14 are detected by a video detector 16, and the detected signals are amplified by a video amplifier 18 before being coupled to a frequency selection network 20 (e.g., including a comb filter). Output signals from network 20 correspond to separated luminance (Y) and chrominance (C) components of the color television signal. The luminance component has a relatively wide bandwidth extending to approximately 4.2 MHz. The upper frequency range of the luminance component, in particular between 3.08 MHz and 4.08 MHz, is shared with the chrominance component, which comprises a subcarrier signal of 3.58 MHz amplitude and phase modulated with color information. The chrominance component is supplied to a chrominance processor 25 (e.g., including amplifier and color demodulator stages) for producing output color difference signals R-Y, G-Y and B-Y. The luminance signal output of network 20 is processed by an automatic peaking control system 30 which imparts controllable amounts of horizontal peaking to the luminance signal. The controllably peaked luminance signal output of system 30 is coupled via a luminance processor 40 (e.g., including amplifier stages, and brightness and contrast control circuits) to a matrix 44, where the peaked luminance signal is combined with the color difference signals from process 25 to develop color image representative signals R, G and B. A color kinescope 45 displays a color image in response to color signals R, G and B.

An automatic gain control (AGC) signal is derived in response to the amplitude of the detected video signal by means of an AGC network 17. The AGC signal serves to control the signal gain of the RF amplifier stage in tuner 12 and the signal gain of the IF amplifier in network 14 to maintain the detected television signal from unit 16 at a desired level. The level of the AGC signal is an indicator of the strength of the received television signal, and is used in conjunction with the control circuit of FIG. 2 as will be discussed.

Automatic peaking control system 30 includes a peaking generator 32 responsive to the luminance signal for generating a horizontal peaking signal component which is combined with the luminance signal in a combiner 33 to produce a peaked luminance signal at the output of combiner 33. Peaking generator 32 can be of the type disclosed in the aforementioned patent application of W. E. Harlan, incorporated herein by reference. The magnitude of the peaking signal developed by peaking generator 32, and thereby the amount of horizontal peaking imparted to the luminance signal, is a function of the high frequency content of the luminance signal from frequency selection network 20. In this regard the high frequency components of the luminance signal, including noise, are selectively coupled via a filter 35 to an average responding amplitude detector 36. Detector 36 provides an output control signal proportional to the level of high frequency components from filter 35.

The detector control signal is applied to a gain control input of peaking generator 32 for controlling the level of the peaking signal from generator 32 inversely relative to the level of the detected luminance signal high frequency content. Thus the peaking signal level respectively increases and decreases as the luminance signal high frequency content decreases and increases. The level of the peaking signal from generator 32 can also be controlled manually such as by means of a viewer adjustable potentiometer 31 coupled to generator 32. A manual peaking control of this type is disclosed in the aforementioned copending patent application of W. E. Harlan.

The detected output signal from detector 36 represents the high frequency information content of the luminance signal over a given frequency range. The detection frequency response of network 30 can, for example, encompass a frequency range from approximately 1.0 MHz. to 3.0 MHz. (at the −3 db points) with a peak amplitude response at approximately 2.0 MHz. The frequency response is primarily determined by the characteristics of filter 35, which can be a high-pass or a bandpass filter. As a practical matter, the typical frequency response of an overall television receiver system and the frequency content of normally experienced luminance signals are such that the described detection frequency response provides a suitable indication of luminance signal high frequency content including peaking and noise components. However, other detector frequency responses are also possible, depending on the requirements of a particular system.

Automatic peaking control network 30 is arranged to controllably increase luminance signal peaking (i.e., increase the slope of luminance signal amplitude transitions) by adding controlled amounts of the peaking signal from generator 32 to the luminance signal. Thus a peaked luminance signal exhibits an amplitude transition with a slope greater than the slope of an "unpeaked" signal. A depeaked luminance signal exhibits a peaking component and corresponding amplitude transition slope less than that of a peaked signal, but equal to or greater than that of an "unpeaked" luminance signal. A peaking control network of this type is described in the aforementioned patent application of W. E. Harlan.

Peaking control network 30 is arranged to operate with respect to the normally expected high frequency content of the luminance signal such that a nominal amount of peaking is normally added to the luminance signal, sufficient to produce a desired pleasing color picture display for normally expected luminance signal conditions. With respect to manual peaking control, the nominal peaking level may correspond to a center setting of manually adjustable peaking control 31. The luminance signal peaking is automatically and manually controllable with respect to the nominal peaking level to produce a peaked or depeaked luminance signal as mentioned above.

It is noted that the control signal output of detector 36 will be primarily representative of high frequency noise components in the presence of a weak, noisy received television signal, and will result in a depeaked luminance signal for this signal condition. In this situation the displayed color picture may appear to undesirably exhibit oversaturated color due to an imbalance between the chrominance signal and the luminance signal, the latter being depeaked relative to the nominal peaking condition of the luminance signal. Specifically, such oversaturated color condition results from the fact that unsuppressed noise is coupled via the chrominance channel, and adds to the chrominance signal, whereas noise is attenuated in the luminance channel as a result of depeaking the luminance signal. The visible effect of the oversaturated color condition produced by such chrominance-luminance imbalance can also occur in a system wherein luminance signal depeaking is produced by a subtractive process which actually reduces the slope of amplitude transitions relative to the slope of an "unpeaked" luminance signal. A system of this type is described in U.S. Pat. No. 4,081,836—Skinner.

In the present arrangement, the visible effect of the oversaturated color condition is reduced by reducing the amplitude of the chrominance signal, and thereby reducing color saturation, when depeaking occurs in the luminance signal. Specifically, if the noise representative control signal from detector 36 is large enough to exceed the threshold conduction level of a normally non-conductive threshold network 38, threshold network 38 conducts a control signal proportional to the detector control signal to a gain control input of chrominance processor 25. Network 38 may comprise a normally non-conductive amplifier which, when enabled to conduct in response to the detector control voltage, provides a suitable gain control output signal proportional to the detector control signal. The conducted gain control signal serves to proportionally modify the signal gain of chrominance signal amplifiers within processor 25 with a sense for reducing the amplitude of the chrominance signal, to thereby reduce color saturation. The control signal conducted by threshold network 38 preferably varies linearly. However, other predetermined relationships with the control signal from detector 36 may also be employed. The picture color saturation can be reduced by controlling the chrominance signal prior to demodulation in processor 25, or by controlling the demodulated color difference signals.

The described oversaturated color condition is perceptible to a viewer as a result of the viewer visually averaging the intensity of the overall picture color content. An average detector, rather than a peak detector, is employed for detector 36 since an average detector is preferred to detect the high frequency content of the video signal particularly under weak, noisy received signal conditions, for the purpose of ultimately compensating for the oversaturated color condition. An average detector provides a useable indication of high density (i.e., long term average) high frequency noise such as is typically associated with weak signal conditions, compared to sporadically occurring impulse noise.

FIG. 2 illustrates a modification to the embodiment of the control apparatus shown in FIG. 1. In FIG. 2, detector 36 and threshold network 38 correspond to the similarly identified elements shown in FIG. 1. The apparatus of FIG. 2 additionally includes an AND logic gate 50, a threshold conduction network 52, and a normally non-conductive gate 55 (e.g., a signal transmission gate or analog electronic switch).

The arrangement of FIG. 2 uses AGC information to indicate the presence of weak received television signals. In this arrangement it is assumed that the detector control signal appearing at the output of threshold network 38 exhibits a positive-going sense with increasing levels of high frequency noise detected by detector 36, and that the output of AGC responsive threshold network 52 also exhibits a positive-going sense in response to the input AGC signal representative of increasingly weak (i.e., lower amplitude) received television signal conditions. The output from threshold network 38 varies in proportion to the detected signal from detector 36, and is applied to one input of AND gate 50 and to a signal input of gate 55. The output signal from AGC responsive threshold network 52 can be fixed or variable after the threshold conduction level of network 52 is exceeded, since this signal serves only as a logic signal for controlling AND gate 55.

The output of AND gate 50 exhibits a positive level (i.e., a "1" logic level) for enabling gate 55 to conduct the detector control signal from threshold network 38 to the gain control input of chrominance processor 25 only when the signal inputs of gate 50 are sufficiently large in a positive sense (i.e., only when these input signals both exhibit a "1" logic level). Thus in this embodiment the amplitude of the chrominance signal and thereby the described oversaturated color condition will be reduced only when the noise representative control signal from detector 36 is large in response to a significant amount of high frequency noise for depeaking the luminance signal significantly, and when the output from threshold network 52 is large and thereby indicates the presence of a noticeably weak received television signal. Accordingly, the arrangement of FIG. 2 provides additional assurance that the unwanted oversaturated color condition will be compensated when the detected high frequency noise is associated with a weak received signal condition.

What is claimed is:

1. In a system for processing a color image representative video signal including luminance and chrominance signal components, apparatus comprising:
   filter means for selectively passing high frequency components, including noise, of said video signal;
   peaking control means responsive to the magnitude of said selectively passed high frequency components for producing a controllably peaked luminance signal in response to the magnitude of passed high frequency components exhibiting a first sense, and for producing a controllably depeaked luminance signal in response to the magnitude of passed high frequency components exhibiting a second sense, relative to a nominal peaking condition of said luminance signal; and
   means for attenuating said chrominance signal in response to the magnitude of said passed high frequency components of said second sense corresponding to said produced depeaked condition of said luminance signal.

2. In a system for processing a color image representative video signal including luminance and chrominance signal components, apparatus comprising:
   filter means for selectively passing high frequency components, including noise, of said video signal;
   peaking control means responsive to the magnitude of said selectively passed high frequency components for producing a controllably peaked luminance signal in response to the mangitude of passed high frequency components exhibiting a first sense, and for producing a controllably depeaked luminance signal in response to the magnitude of passed high frequency components exhibiting a second sense, relative to a nominal peaking condition of said luminance signal; and
   means for attenuating said chrominance signal in response to the magnitude of said passed high frequency components of said second sense corresponding to said produced depeaked condition of said luminance signal; wherein
   said attenuating means attenuates said chrominance signal in response to the magnitude of said passed high frequency components of said second sense traversing a given threshold level, and said attenuating means is inoperative to attenuate said chrominance signal in the absence of the magnitude of said passed high frequency components of said second sense traversing said threshold level.

3. In a system for processing a color image representative video signal including luminance and chrominance signal components, and including means for deriving a signal representative of the magnitude of said video signal, apparatus comprising:
   filter means for selectively passing high frequency components, including noise, of said video signal;
   peaking control means responsive to the magnitude of said selectively passed high frequency components for producing a controllably peaked luminance signal in response to the magnitude of passed high frequency components exhibiting a first sense, and for producing a controllably depeaked luminance signal in response to the magnitude of passed high frequency components exhibiting a second sense, relative to a nominal peaking condition of said luminance signal; and
   means for attenuating said chrominance signal in response to the magnitude of said passed high frequency components of said second sense corresponding to said produced depeaked condition of said luminance signal; wherein
   said attenuating means attenuates said chrominance signal in response to the presence of (a) said passed high frequency components of said second sense, and (b) said derived signal being representative of a weak video signal.

4. In a system for processing a color image representative video signal including luminance and chrominance signal components, apparatus comprising:
   filter means for selectively passing high frequency components, including noise, of said video signal;

peaking control means responsive to the magnitude of said selectively passed high frequency components for producing a controllably peaked luminance signal in response to the magnitude of passed high frequency components exhibiting a first sense, and for producing a controllably depeaked luminance signal in response to the magnitude of passed high frequency components exhibiting a second sense, relative to a nominal peaking condition of said luminance signal; and means for attenuating said chrominance signal in response to the magnitude of said passed high frequency components of said second sense corresponding to said produced depeaked condition of said luminance signal;

wherein said peaking control means responds to the average magnitude of said passed high frequency components.

5. In a system for processing a color image representative video signal including luminance and chrominance signal components, apparatus comprising:

peaking means responsive to said luminance signal for generating an output peaking component, said peaking means providing controllable amounts of said output peaking component in response to a peaking control signal;

means for combining said luminance signal with said controllable peaking component for producing a controllably peaked and depeaked luminance signal relative to a nominal peaking condition of said luminance signal;

frequency selective control means responsive to said luminance signal for providing an output peaking control signal representative of the level of luminance signal high frequency components, including noise, within a given frequency range;

means for coupling said peaking control signal to said peaking means for controlling said peaking component such that said luminance signal is relatively peaked when said peaking exhibits a magnitude with a first sense, and relatively depeaked when said peaking control signal exhibits a magnitude with a second sense; and means responsive to said peaking control signal for attenuating said chrominance component in accordance with the magnitude of said peaking control signal of said second sense corresponding to said produced depeaked condition of said luminance signal.

6. Apparatus according to claim 5, wherein said attenuating means attenuates said chrominance signal in response to the magnitude of said peaking control signal of said second sense traversing a threshold level, and said attenuating means is inoperative to attenuate said chrominance signal in the absence of the magnitude of said peaking control signal of said second sense traversing said threshold level.

7. Apparatus according to claim 5 in a system including means for deriving a signal representative of the magnitude of said video signal, wherein said attenuating means attenuates said chrominance signal in response to the presence of (a) said peaking control signal of said second sense, and (b) said derived signal being representative of a weak video signal.

8. Apparatus according to claim 5, 6 or 7, wherein said frequency selective control means responds to the average magnitude of said high frequency components including noise.

9. Apparatus according to claim 8, wherein said control means comprises:

filter means responsive to said luminance signal for selectively passing high frequency components, including noise, of said luminance signal; and average detector means for providing said peaking control signal in response to said selectively passed high frequency components from said filter means.

10. In a color television receiver for processing a received color television signal including color image representative luminance and chrominance signal components, said receiver including an input stage for receiving said television signal; means responsive to said color television signal for providing to said input stage an automatic gain control signal for maintaining said television signal at a desired level; a luminance signal processing channel; a chrominance signal processing channel; and a color image reproducing device for displaying a color image in response to luminance and chrominance signals received from said luminance and chrominance channels; apparatus comprising:

frequency selection means for selectively passing high frequency components, including noise, contained in said luminance signal;

peaking control means responsive to the average magnitude of said selectively passed high frequency components for producing a controllably peaked luminance signal in response to the magnitude of passed high frequency components exhibiting a first sense, and for producing a controllably depeaked luminance signal in response to the magnitude of passed high frequency components exhibiting a second sense, relative to a nominal peaking condition of said luminance signal; and attenuating means coupled to a gain control input of said chrominance channel for attenuating said chrominance signal in response to the presence of (a) said passed high frequency components of said second sense, and (b) a control signal proportional to said automatic gain control signal and representative of a weak received television signal, whereby the color saturation of a displayed color image is correspondingly reduced.

11. Apparatus according to claim 10, wherein said proportional control signal is derived from said automatic gain control signal.

12. In a color television receiver for processing a received color television signal including color image representative luminance and chrominance signal components, said receiver including an input stage for receiving said television signal; means responsive to said color television signal for providing to said input stage an automatic gain control signal for maintaining said television signal at a desired level; a luminance signal processing channel; a chrominance signal processing channel; and a color image reproducing device for displaying a color image in response to luminance and chrominance signals received from said luminance and chrominance channels; apparatus comprising:

peaking means responsive to said luminance signal for generating an output peaking component, said peaking means providing controllable amounts of said output peaking component in response to a peaking control signal;

means for combining said luminance signal with said controllable peaking component for producing a controllably peaked and depeaked luminance signal relative to a nominal peaking condition of said luminance signal;

frequency selective control means responsive to said luminance signal for providing an output peaking control signal representative of the average magnitude of luminance signal high frequency components, including noise, within a given frequency range;

means for coupling said peaking control signal to said peaking means for controlling said peaking component such that said luminance signal is relatively peaked when said peaking control signal exhibits a magnitude with a first sense, and relatively depeaked when said peaking control signal exhibits a magnitude with a second sense; and means, including coincidence detector means, for attenuating said chrominance signal in accordance with the magnitude of said peaking control signal in response to the detected coincidence of (a) said peaking control signal of said second sense, and (b) said automatic gain control signal being representative of a weak received television signal, whereby the color saturation of a displayed color image is correspondingly reduced.

13. In a system for processing a color image representative video signal including luminance and chrominance signal components, apparatus comprising:

filter means for selectively passing high frequency components, including noise, of said video signal;

peaking control means responsive to the magnitude of said selectively passed high frequency components for producing a controllably peaked luminance signal in response to the magnitude of passed high frequency components exhibiting a first sense, and for producing a controllably depeaked luminance signal in response to the magnitude of passed high frequency components exhibiting a second sense, relative to a nominal peaking condition of said luminance signal; and means for attenuating said chrominance signal in response to the magnitude of said passed high frequency components of said second sense, corresponding to said produced depeaked condition of said luminance signal, traversing a given threshold level; said attenuating means being inoperative to attenuate said chrominance signal in the absence of the magnitude of said passed high frequency components of said second sense traversing said threshold level;

wherein said peaking control means responds to the average magnitude of said passed high frequency components.

14. In a system for processing a color image representative video signal including luminance and chrominance signal coponents and comprising means for deriving a signal representative of the magnitude of said video signal, apparatus comprising:

filter means for selectively passing high frequency components, including noise, of said video signal;

peaking control means responsive to the magnitude of said selectively passed high frequency components for producing a controllably peaked luminance signal in response to the magnitude of passed high frequency components exhibiting a first sense, and for producing a controllably depeaked luminance signal in response to the magnitude of passed high frequency components exhibiting a second sense, relative to a nominal peaking condition of said luminance signal; and means for attenuating said chrominance signal in response to (a) the magnitude of said passed high frequency components of said second sense, corresponding to said produced depeaked condition of said luminance signal, when present, and in response to (b) said derived signal being representative of a weak video signal, when present;

wherein said peaking control means responds to the average magnitude of said passed high frequency components.

* * * * *